United States Patent [19]

Yokota

[11] Patent Number: 4,481,613

[45] Date of Patent: Nov. 6, 1984

[54] OPTICAL DISK APPARATUS

[75] Inventor: Tsuneshi Yokota, Kawasaki, Japan

[73] Assignee: Tokyo Shibaura Denki Kabushiki Kaisha, Japan

[21] Appl. No.: 373,788

[22] Filed: Apr. 30, 1982

[30] Foreign Application Priority Data

May 1, 1981 [JP] Japan .................................. 56-66479

[51] Int. Cl.$^3$ ............................................. G11B 21/08
[52] U.S. Cl. ...................................... 369/56; 369/44; 369/98; 369/219; 360/78
[58] Field of Search ...................... 369/32, 43, 44, 52, 369/56, 98, 219, 215, 33; 360/75, 78, 101

[56] References Cited

U.S. PATENT DOCUMENTS

| 4,214,756 | 7/1980 | Ohmura | 369/215 X |
| 4,230,323 | 10/1980 | Tsuji et al. | 369/52 X |
| 4,293,944 | 10/1981 | Izumita et al. | 369/45 |
| 4,323,997 | 4/1982 | Kuribayashi et al. | 369/33 |
| 4,361,880 | 11/1982 | Kitamura et al. | 369/56 X |
| 4,397,009 | 8/1983 | Eriksson | 360/78 X |

OTHER PUBLICATIONS

Fujitsu Scientific & Technical Journal, pp. 95–118, Mar. 1974.

Primary Examiner—Robert L. Richardson
Attorney, Agent, or Firm—Cushman, Darby & Cushman

[57] ABSTRACT

An optical head is mounted on a carrier of a linear motor, and is moved at a high speed to a desired track, i.e., a target position, of an optical disk by the linear motor. In the optical head, a laser oscillator for generating a laser beam, a tracking unit for tracking a laser beam and a focusing unit for focusing a laser beam onto an optical disk are integrally assembled.

4 Claims, 8 Drawing Figures

OPTICAL DISK APPARATUS

BACKGROUND OF THE INVENTION

This invention relates to an optical disk apparatus and, more particularly, to an optical disk apparatus making use of a laser beam.

Because optical disk apparatus are capable of high density recording of a great quantity of data, these devices are attracting wide and eager attention and various types of optical disk apparatus are in practical use. Among these various optical disk apparatus, those based on the laser system are most popular. In the prior art laser system optical disk apparatus, a mechanism for converting the rotational motion of a motor into a translational motion is used to cause an optical head to trace data tracks of an optical disk for reading out data from the first to last tracks, progressively. Therefore, it is difficult to make random access to the data recorded on the optical disk tracks at a high speed by using the optical head. Also, it is difficult to ensure accurate tracking.

SUMMARY OF THE INVENTION

An object of the invention is to provide an optical disk apparatus, which permits random access to data at a high speed and also ensures accurate tracking.

According to the invention, there is provided an optical disk apparatus, in which an optical head is mounted in a carrier of a linear motor and a semiconductor laser oscillator, a focusing unit, a tracking unit and a signal detector for producing a focus error signal for effecting focusing and a position error signal for effecting tracking are assembled in the optical head, for self-focusing and self-tracking.

DETAILED DESCRIPTION OF THE PREFERRED EMBODIMENT

Figure 1:
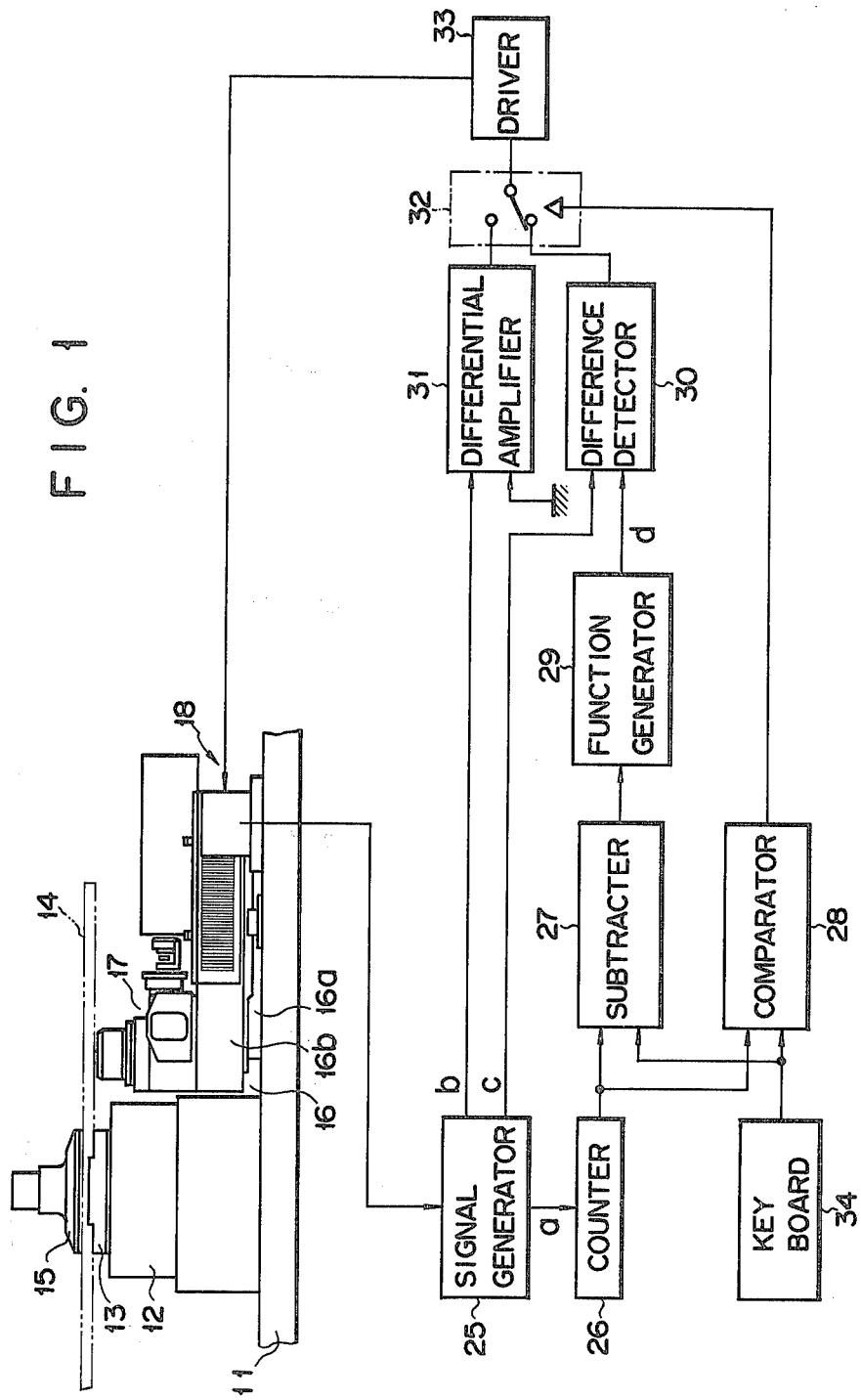
FIG. 1 is a schematic representation, partly in block diagram form, showing one embodiment of the optical disk apparatus according to the invention.
Figure 2:
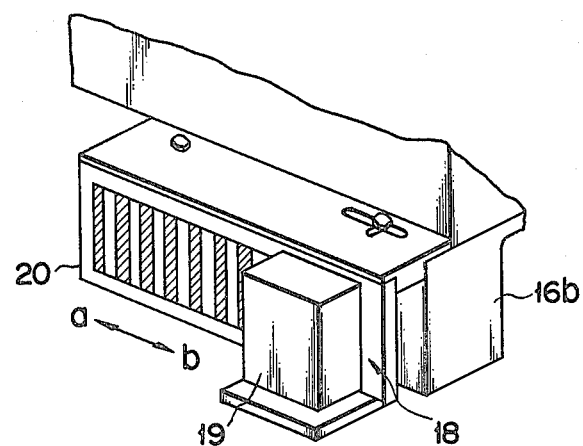
FIG. 2 is a fragmentary perspective view showing a position detector for detecting the position of an optical head shown in FIG. 1.
Figure 3:
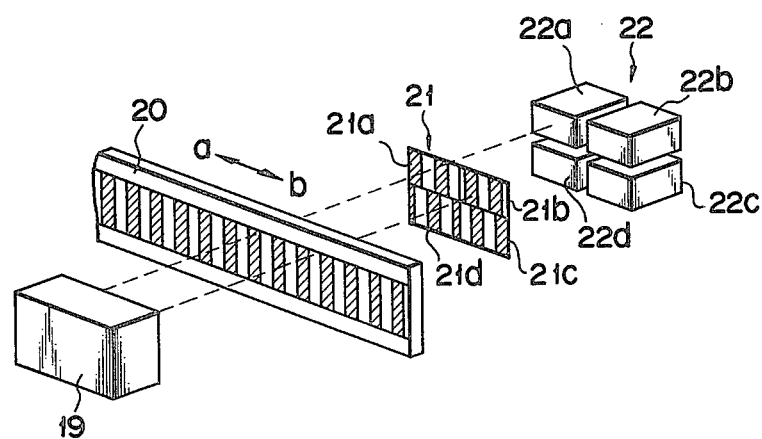
FIG. 3 is an exploded perspective view showing a position detector shown in FIG. 2.

Referring to FIG. 1, there is shown an optical disk apparatus, in which a support plate 11 supports a motor 12. The motor 12 has a shaft (not shown) carrying a turntable 13 fitted thereon. An optical disk 14 is set on the turntable 13, and it is urged and secured to the turntable by a clamping member 15. The support plate 11 also carries a stator 16a of a linear motor 16 mounted on it, and an optical head 17 is mounted on a carrier 16b of the linear motor 16. The support plate 11 further supports a position detector 18 for detecting the position of the optical head 17. The position detector 18 includes a light emitting element 19 mounted to the support plate 11 and an optical scale plate 20 secured to the carrier 16b. FIG. 2 shows the light emitting element 19 and an optical scale plate 20 in their mounted state. The optical scale plate 20 has a lattice pattern, and a filter 21, which includes four optical filter sections 21a to 21d having respective lattice patterns being the same in form as the lattice pattern of the optical scale plate 20 but formed at different phases, is disposed to face the light emitting element 19, mentioned above, via the optical scale plate 20, as shown in FIG. 3. Further, a light detector 22, which is constituted by four photoelectric elements 22a to 22d individually corresponding to the respective filter sections 21a to 21d of the filter 21, is disposed to face the light emitting element 19 via the filter 21 and optical scale plate 20.

The output terminal of the position detector 18, i.e., the output terminal of the light detector 22, is connected to the input terminal of a signal generator 25 shown in FIG. 1. The signal generator 25 generates a position pulse signal a, a positioning signal b and a speed signal c, and has an output terminal for the signal a connected to the input terminal of a counter 26. The output terminal of the counter 26 is connected to one input terminal of a subtracter 27 and also to one input terminal of a comparator 28. The subtracter 27 and comparator 28 have their other input terminals connected to a signal source, for example, keyboard 34 which generates a target position signal. The output terminal of the subtracter 27 is connected to the input terminal of a function generator 29. The function generator 29 includes a ROM and a D/A converter and generates a speed curve signal d. The output terminal of the function generator 29 and the output terminal of the signal generator 25 for the signal c, are connected to the input terminal of a difference detector 30. The output terminal b of the signal generator 25 is connected to the input terminal of a differential amplifier 31 and the other input terminal of differential amplifier 31 is corrected to a OV reference. The difference detector 30 and differential amplifier 31 have their output terminals connected to respective switched terminals of a switching element 32, which has its common terminal connected to a driver 33. The output terminal of the driver 33 is connected to drive the linear motor 16.

Figure 4:
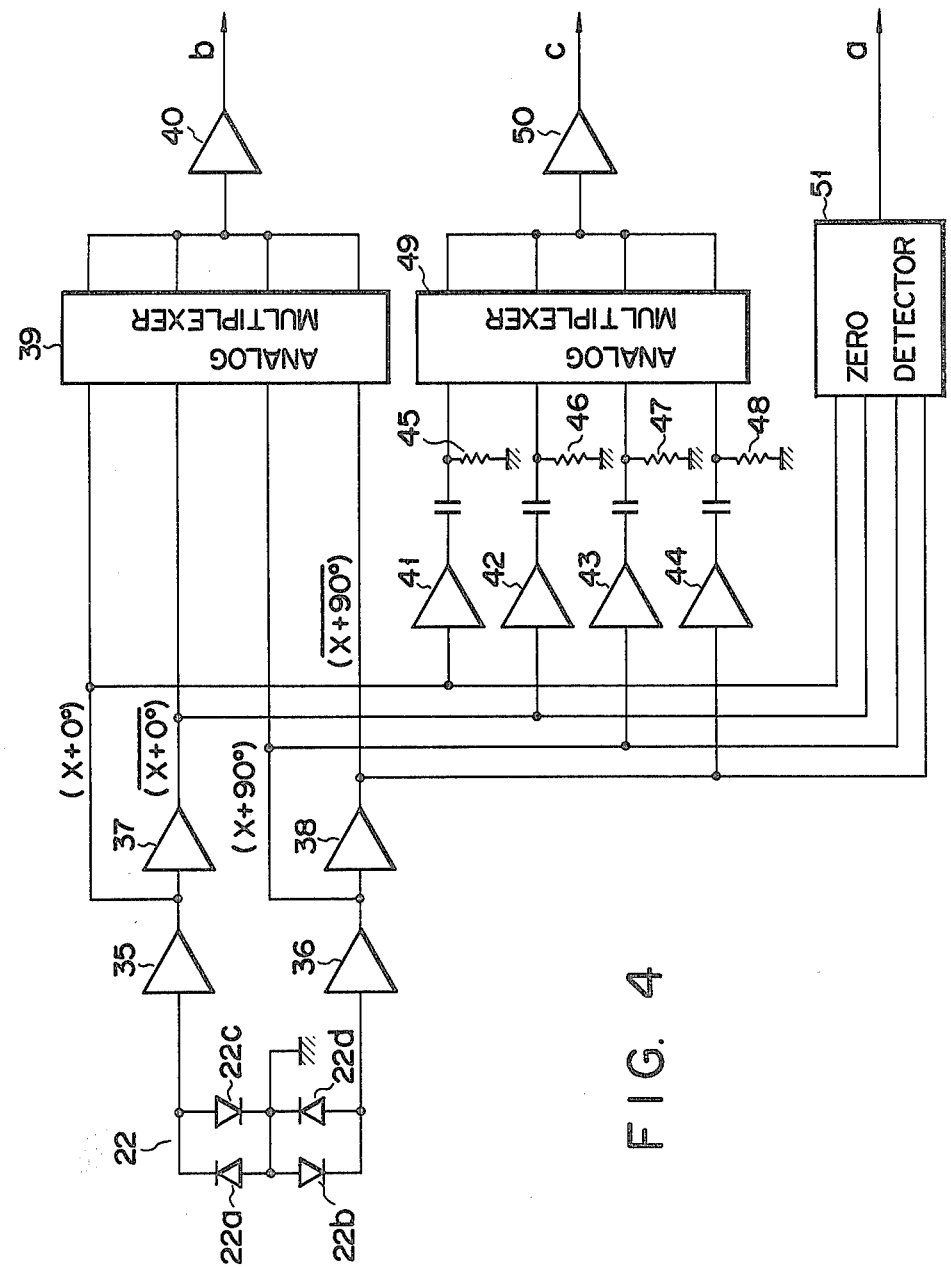
FIG. 4 is a circuit diagram, partly in block form, showing a signal generator shown in FIG. 1.

FIG. 4 shows the signal generator 25. As is shown, a light detector 22 has its output terminals connected to an input terminal of each of amplifiers 35 and 36. The amplifiers 35 and 36 have their output terminals directly connected to respective input terminals of an analog multiplexer 39 and also connected through amplifiers 37 and 38 to respective other input terminals of the analog multiplexer 39. The output side of the analog multiplexer 39 is connected to an input terminal of amplifier 40. The buffer amplifier 40 produces the signal b.

The output terminals of the amplifiers 35, 37, 36 and 38 are respectively connected to input terminals of buffer amplifiers 41 to 44. The output terminals of the buffer amplifiers 41 to 44 are respectively connected to input terminals of differential circuits 45 to 48. The output terminals of the differential circuits 45 to 48 are connected through a multiplexer 49 to the input terminal of a buffer amplifier 50. The buffer amplifier 50 produces the signal c. The output terminals of the amplifiers 35 to 38 are also connected to respective input terminals of a zero detector 51. The zero detector 51 produces the signal a by detecting zero points of the output signals of the amplifiers 35 to 38 at the rising and leading edges of these signals.

Figure 5:
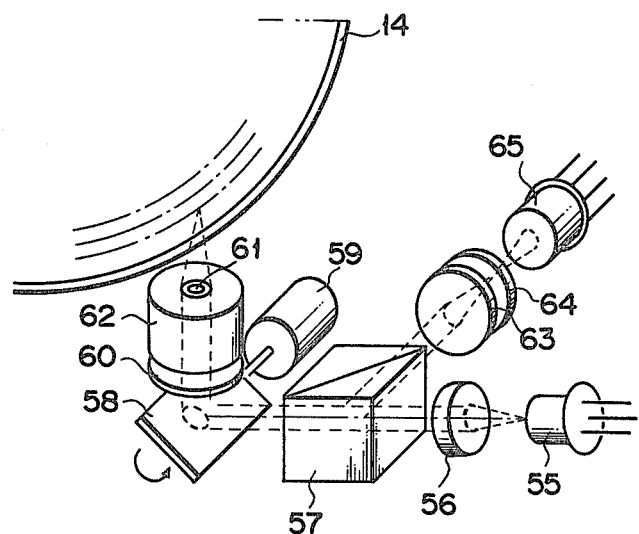
FIG. 5 is a perspective view showing the internal construction of the optical head shown in FIG. 1.

FIG. 5 shows the internal construction of the optical head 17. A semiconductor laser oscillator 55 generates a laser beam. In the path of the laser beam, a collimating lens 56, a beam splitter 57 and a galvanometer mirror 58 are disposed in the mentioned order. The galvanometer mirror 58 is coupled to a shaft of a drive coil 59 and constitutes a tracking unit. It is rotated by the drive force of the drive coil 59. A focusing unit for focusing the laser beam, reflected by the galvanometer mirror 58 of the tracking unit onto the optical disk 14, is provided between the optical disk 14 and galvanometer mirror 58. The focusing unit includes a ¼ wavelength plate 60, an objective lens 61 and a voice coil 62 for driving the objective lens 61. A cylindrical lens 63, a convex lens 64 and a laser beam detector 65 are provided in the mentioned order on one side of the beam splitter 57.

Figure 6:
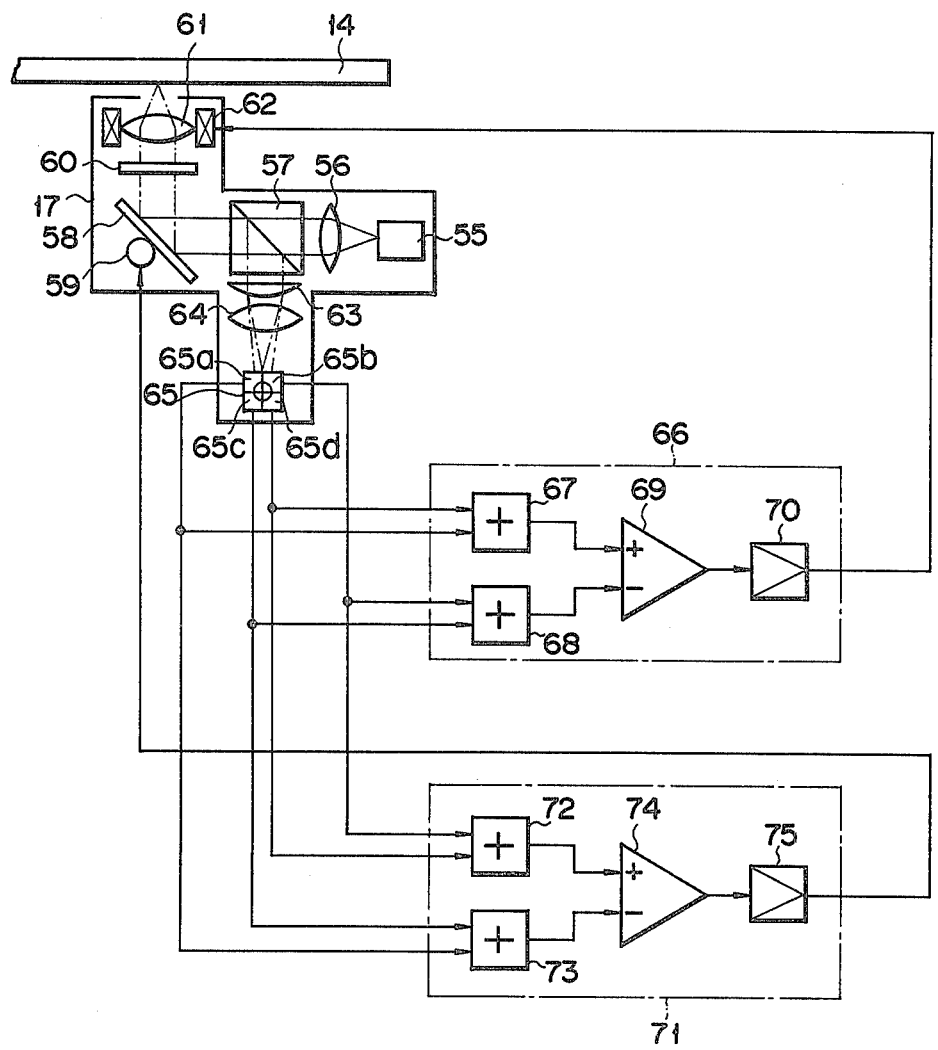
FIG. 6 is a circuit diagram showing a circuit for the tracking and focusing of the optical head.

The optical head 17 having the construction as described above is connected to an electric circuit as shown in FIG. 6. More particularly, the laser beam detector 65 has four photoelectric elements 65a to 65d. Of these photoelectric elements, the elements 65a and 65d are connected to respective input terminals of an adder 67 in focusing circuit 66, and the other two elements 65b and 65c are connected to respective input terminals of an adder 68 in the focusing circuit 66. The output terminals of the adders 67 and 68 are connected to the non-inversion and inversion terminals of an operational amplifier 69, respectively. The output terminal of the operational amplifier 69 is connected through an amplifier 70 to a voice coil 62. The photoelectric elements 65b and 65d are also connected to the respective input terminals of an adder 72 in tracking servo circuit 71, and the photoelectric elements 65a and 65c are also connected to the respective input terminals of an adder 73 in the circuit 71. The output terminals of the adders 72 and 73 are respectively connected to the non-inversion and inversion terminals of an operational amplifier 74. The output of the operational amplifier 74 is connected through an amplifier 75 to the galvanometer mirror drive coil 59.

The operation of the optical disk apparatus having the above construction will now be described.

Figure 7:
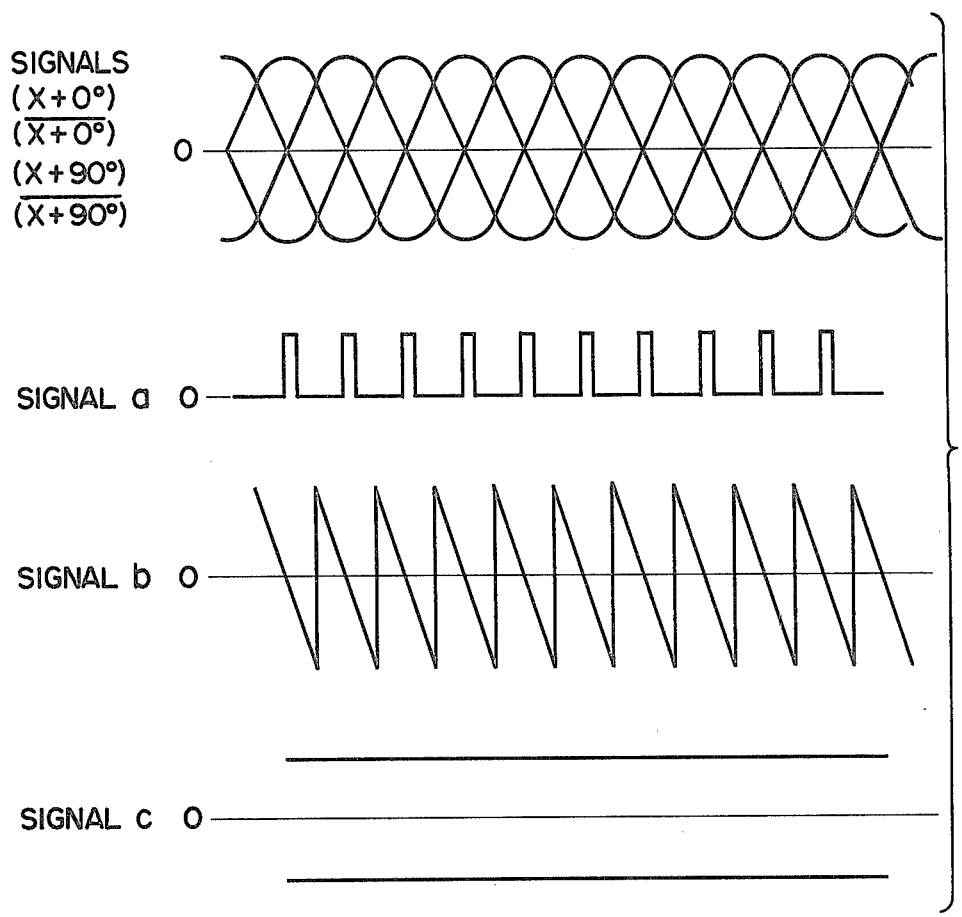
FIG. 7 is a waveform diagram showing signals generated in the circuit of FIG. 1.
Figure 8:
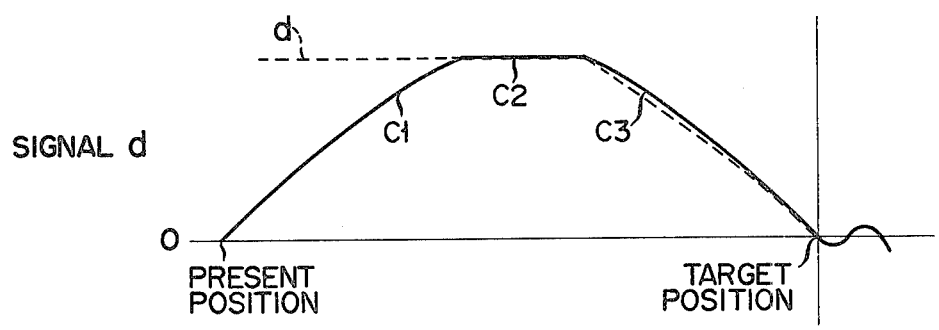
FIG. 8 is a waveform diagram showing the output waveform of a function generator shown in FIG. 1.

When the power source for the optical disk apparatus is connected, the light emitting element 19 of the position detector 18 (FIG. 2) emits light. The light emitted is coupled through the optical scale 20 and optical filter 21 to be incident on the light detector 22. The filter sections 21a to 21d of the optical filter 21 have respective lattice patterns which are successively out of phase by 90 degrees. In other words, when the lattice pattern of the filter section 21a coincides in phase with the lattice pattern of the optical scale 20, the lattice patterns of the filter sections 21b, 21c and 21d are out of phase with respect to the lattice pattern of the optical scale 20 respectively by ¼, 2/4 and ¾ of the lattice pattern pitch. Thus, when the light from the light emitting element 19 is coupled through the optical scale 20 and optical filter 21 to be incident on the light detector 22, photoelectric signals corresponding to light transmitted through the respective filter sections 21a to 21d are provided from the photoelectric elements 22a to 22d. When these photoelectric signals are coupled to the signal generator 25, they are amplified by the amplifiers 35 and 36, which thus produces signals $(x+0°)$ and $(x+90°)$. These output signals of the amplifiers 35 and 36 are converted through the amplifiers 37 and 38 into signals $\overline{(x+0°)}$ and $\overline{(x+90°)}$. FIG. 7 shows the signals $(x+0°)$, $\overline{(x+0°)}$, $(x+90°)$ and $\overline{(x+90°)}$. As these signals are coupled to the zero detector 51, the zero detector 51 produces the position pulse signal a in response to the zero points of these signals occurring in the rising and falling edges thereof. Meanwhile, as the aforementioned signals $(x+0°)$, $\overline{(x+0°)}$, $(x+90°)$ and $\overline{(x+90°)}$ are supplied to the analog multiplexer 39, an analog position signal b is produced from the buffer amplifier 40. Further, as the aforementioned signals are coupled through the buffer amplifiers 41 to 44 to the differential circuits 45 to 48 for differentiation and the outputs therefrom are supplied to the analog multiplexer 49, the speed signal c is produced from the buffer amplifier 50. The counter 26 counts pulses of the pulse signal a supplied to it and produces a corresponding count signal supplied to the subtracter 27 and comparator 28. The subtracter 27 subtracts the count value of the counter 26 (representing the current position) from a target position value corresponding to a target position signal, for instance coupled from a keyboard 34. The output of the subtracter 27, i.e., a signal representing the difference between the target position and current position, is coupled to the function generator 29. The function generator 29 produces a speed curve signal d (FIG. 7) corresponding to the difference signal from the subtracter 27. The speed curve signal d is supplied together with the speed signal c from the signal generator 25 to the difference detector 30. The difference detector 30 produces a signal corresponding to the difference signal between the speed signal c and speed curve signal d. When the output signal of the difference detector 30 is supplied through the switching element 32 to the driver 32, the driver 33 drives the linear motor 16. The linear motor 16 is linearly driven according to the speed curve of the speed curve signal shown in FIG. 8. More particularly, the linear motor 16 is first driven with a linear acceleration (curve c1) and then a constant speed (curve c2). When a position near the target position is reached the linear motor 16 is driven with a deceleration (curve c3) up to the target position, as shown in FIG. 8. With the driving of the linear motor 16, the count value of the counter 26 is progressively renewed, and when the count value reaches the target position value, the comparator 28 generates an output signal. With the output signal of the comparator 28 the switching element 32 is switched, whereupon the driver 33 is supplied with the output signal from the differential amplifier 31. The differential amplifier 31 thus produces a signal corresponding to the difference between the signal b from the signal generator 25 and the reference signal (0 V). When the output signal of the differential amplifier 31 is supplied through the switching element 32 to the driver 33, the driver 33 controls the linear motor 18 such as to bring the optical head 17 to the target position. When the optical head 17 is brought to the target position, focusing and tracking are effected. In the focusing and tracking, as the laser beam generated from the semiconductor laser oscillator 55 and coupled through the collimating lens 22 and beam splitter 57 is incident on the galvanometer mirror 58, it is directed by the galvanometer mirror 58 toward the optical disk 14. At this time, the laser beam is focused through the ¼ wavelength plate 60 and the objective lens 61 onto the optical disk 14. The laser beam reflected from the optical disk 14 is coupled through the object lens 61 and ¼ wavelength plate 60, toward the galvanometer mirror 58 to be incident on the beam splitter 57. The beam splitter 57 leads the incident laser beam through the lenses 63 and 64 to the light detector 65. From the photoelectric elements 65a to 65d of the light detector 65 photoelectric signals corresponding to one-fourth split laser components of the laser beam are supplied to the focusing circuit 66 and tracking circuit 71. The focusing circuit 66 produces an output signal corresponding to the out-of-focus or focus error, for instance a positive signal in case of focusing ahead of the disk and a negative signal in case of focusing behind it. When the output signal of the focusing circuit 66 is supplied to the voice coil 62, the objective lens 61 is moved in the axial direction according to the signal for focusing. The tracking signal 71 produces an output signal corresponding to a tracking error, for instance a positive signal if the laser beam is on the outer side of the track and a negative signal if the laser beam is on the inner side of the track. When the tracking signal is supplied to the drive coil 59, the drive coil 59 drives the galvanometer mirror 58 so as to direct the laser beam to the proper track position. In the above way, the focusing and tracking are effected automatically.

As has been described in the foregoing, according to the invention the optical head is mounted on the linear motor and can be moved at a high speed to the target position by the linear motor, so that it is possible to make high speed random access to the optical disk and obtain accurate tracking at the target position. Thus, recording of data on the optical disk or searching and reproduction of data therefrom can be quickly made.

Further, since the light source, focusing unit, tracking unit and detecting circuit, these being necessary for recording or reproduction, are integrally assembled in the optical head mounted on the linear motor, the optical system of the optical disk apparatus can be considerably simplified. Further, since the light path can be contracted, it is possible to prevent departure of the light beam from the light path and ensure high stability.

What is claimed is:

1. An optical disk apparatus comprising:
   a linear motor having a carrier movable in the radial direction of an optical disk;
   an optical head for recording and reproducing information on and from the optical disk, said optical head being mounted on said linear motor and including a semiconductor laser for generating a laser beam, focusing means for focusing the laser beam onto said optical disk, tracking means for causing the laser beam to follow a given track on said optical disk, and detecting means for detecting the state of focusing and tracking;
   a position detecting section for detecting the position of said optical head;
   specifying means for specifying a desired target position;
   position difference detecting means for detecting the difference between the position detected by said position detecting section and the target position specified by said position specifying means; and
   driving means for moving the carrier of said linear motor by a distance corresponding to a position difference detected by said position difference detecting means.

2. The optical disk apparatus according to claim 1, wherein said position detecting section includes an optical scale having a lattice pattern and moved in unison with the carrier of said linear motor, an optical filter having a plurality of different phase lattice pattern sections and held stationary so as to face said optical scale, means for receiving light transmitted through said optical scale and said optical filter and generating an output signal corresponding to the received light, and means for calculating the current position of the optical head from the signal from said signal generating means.

3. The optical disk apparatus according to claim 1 or 2, wherein:
   said focusing means includes an objective lens facing said optical disk and a voice coil for moving said objective lens;
   said tracking means includes galvanometer mirror means for leading the laser beam from the semiconductor laser to the focusing means and causing the laser beam to follow a given track on the optical disk; and
   said state detecting means includes a light detector for receiving the laser beam reflected by the optical disk and detecting the state of focusing and tracking.

4. The optical disk apparatus according to claim 1, wherein said position detecting section includes a position pulse generating circuit for generating position pulses in correspondence to the position of the optical head, a counter for counting the position pulses, means for coupling data corresponding to the target position, means for calculating the difference between the count data from the counter and the target position data from the data coupling means, and means for processing the difference data from the calculating means to generate a speed curve signal for controlling the speed of movement of the linear motor.

* * * * *